(12) United States Patent
Sullivan

(10) Patent No.: US 8,075,035 B1
(45) Date of Patent: Dec. 13, 2011

(54) COVER ASSEMBLY

(75) Inventor: Thomas M. Sullivan, Highland, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 12/878,390

(22) Filed: Sep. 9, 2010

(51) Int. Cl.
*B62D 33/03* (2006.01)
*B62D 33/033* (2006.01)
*B60P 7/02* (2006.01)
(52) U.S. Cl. .... 296/24.4; 296/57.1; 296/52; 296/100.03
(58) Field of Classification Search .......... 296/100.03–100.05, 50, 52, 59, 296/98, 24.4, 24.43, 57.1; 410/129, 130
See application file for complete search history.

(56) References Cited

U.S. PATENT DOCUMENTS

| | | | | |
|---|---|---|---|---|
| 2,143,788 A | * | 1/1939 | Miller | 410/117 |
| 3,072,432 A | * | 1/1963 | Ohle | 296/100.05 |
| 4,795,206 A | * | 1/1989 | Adams | 296/98 |
| 5,823,605 A | * | 10/1998 | Seargeant | 296/100.09 |
| 6,039,379 A | * | 3/2000 | Jordan | 296/37.6 |
| 6,276,735 B1 | | 8/2001 | Champion | |
| 7,404,586 B2 | * | 7/2008 | Seiberling | 296/100.09 |

* cited by examiner

*Primary Examiner* — Dennis Pedder
(74) *Attorney, Agent, or Firm* — Frederick A. Krieger

(57) ABSTRACT

A cover assembly for a motor vehicle having a pair of spaced apart sidewalls. The cover assembly includes a track formed in each sidewall and a panel. A first leg of each track is arranged substantially orthogonal to a floor of the vehicle and a second leg of each track is positioned above the floor and extends from the first leg. The panel is movably coupled to the tracks.

14 Claims, 4 Drawing Sheets

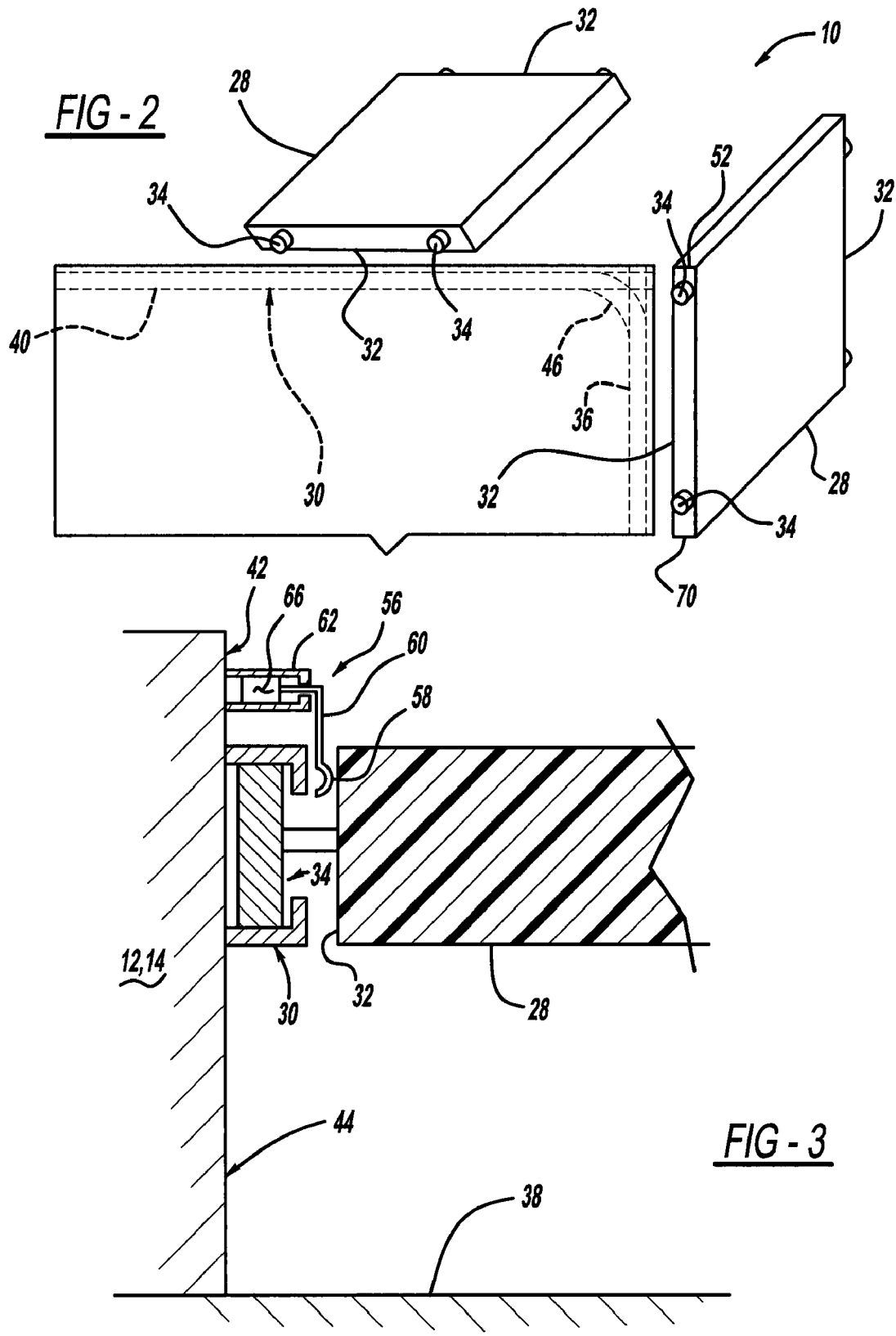

COVER ASSEMBLY

FIELD

The present disclosure relates to a cover assembly for a vehicle.

BACKGROUND

Vehicles such as trucks, SUVs, CUVs, sedans, vans, etc. may have a closure/cover member to cover and/or retain items within a vehicle area. For example, a vehicle may include a tailgate that provides access to a bed of the vehicle. Tailgates, however, can be heavy. Consequently, the tailgate may be difficult to open and close, especially for a person not fully capable of operating the tailgate. Further, when a tailgate is opened relative to the bed, a person may have to lean over the tailgate to remove any items that may be stowed in the bed. Again, this may be a disadvantage to some when retrieving items that may be stowed in the bed. It should be noted there may be other areas of the vehicle where it is desirable to store, protect and retrieve items and therefore also desirable to cover the areas and thereafter easily expose the same areas.

SUMMARY

The present disclosure provides a cover assembly for a vehicle having a pair of spaced apart sidewalls. The cover assembly includes a track positioned on each sidewall and at least one panel coupled to the tracks. Each track includes a first leg arranged substantially orthogonal to a floor of the vehicle. Each track further includes a second leg positioned above the floor and extending from the first leg. The at least one panel is movably coupled to the tracks.

In certain embodiments, the cover assembly further includes a plurality of panels removably coupled together.

In certain embodiments, the cover assembly further includes a plurality of panels configured for slidable movement along the tracks.

In certain embodiments, the cover assembly further includes a linkage assembly configured to engage a portion of panel displaced from the tracks.

A cover assembly for a vehicle having a pair of spaced apart sidewalls is provided. The cover assembly includes a track positioned on each sidewall and at least one panel. Each track includes a first leg arranged substantially orthogonal to a floor extending from the sidewalls. The first leg includes a curved portion extending toward a second leg arranged above the floor. At least one third leg extends from each of the second legs toward the floor. The at least one panel is removable and configured for slidable movement along said tracks to provide access to the floor. The panel is removable though an opening formed in the tracks between the first and second legs and reinsertable into said third legs.

BRIEF DESCRIPTION OF THE DRAWINGS

The present disclosure will become more fully understood from the detailed description and the accompanying drawings, wherein:

FIG. 2 is a perspective view of a portion of an embodiment of a cover assembly according to the present disclosure;

FIG. 3 is a cross-sectional view of a portion of track and roller assembly for an embodiment of a cover assembly according to the present disclosure;

DETAILED DESCRIPTION

The present disclosure is directed to a cover assembly configured to changeably cover and uncover various areas of a vehicle.

Figure 1:
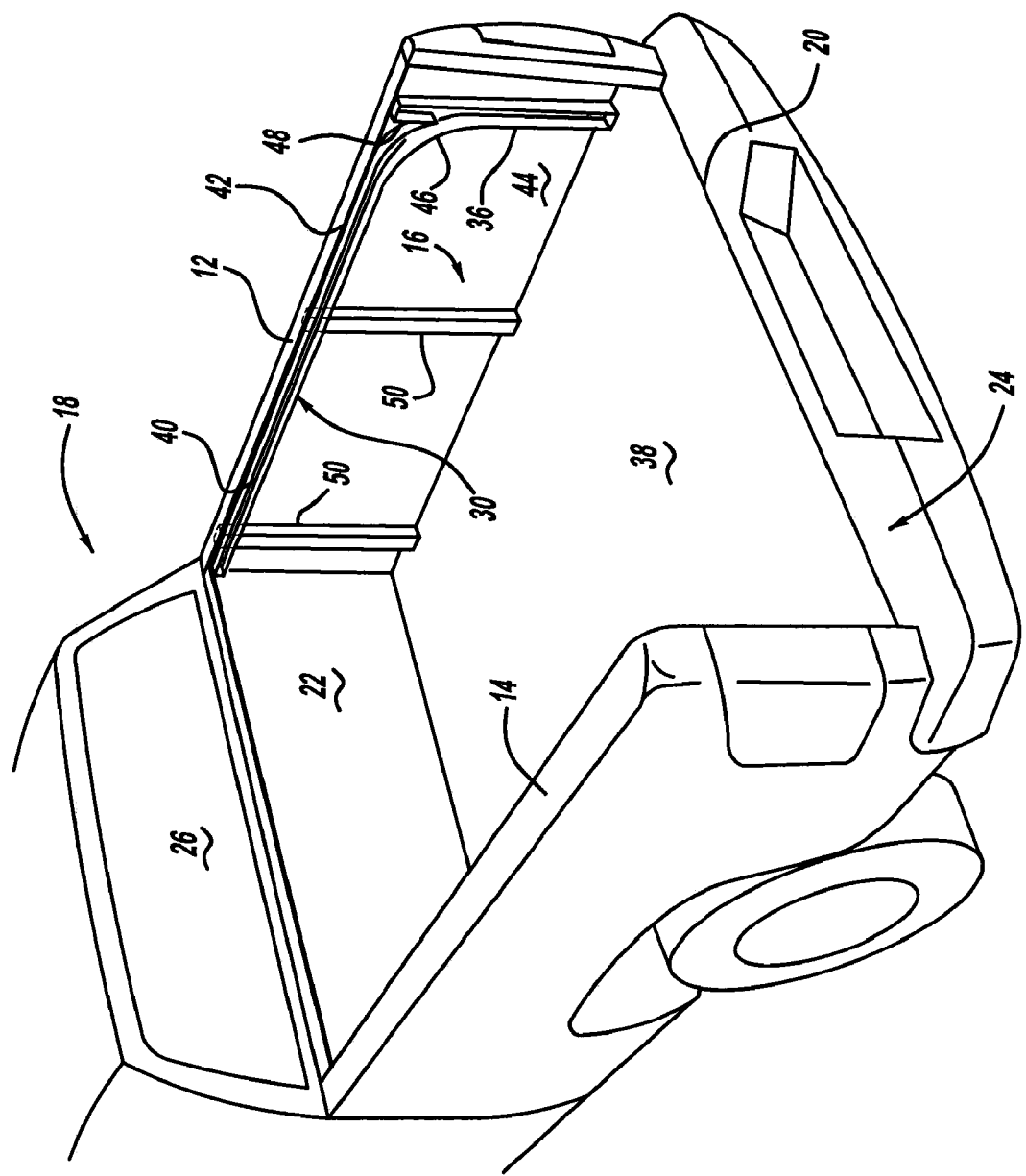
FIG. 1 is a perspective view of a vehicle having a track for an embodiment of a cover assembly according to the present disclosure.

Referring to FIGS. 1 and 2, illustrated is an exemplary embodiment of a cover assembly 10 according to the present disclosure. Cover assembly 10 is provided between a pair of sidewalls 12 and 14 that define a bed 16 of a vehicle 18. In addition to sidewalls 12 and 14, bed 16 is defined by a first end 20 and a second end 22. First end 20 is located proximate a rear 24 of vehicle 18, while second end 22 is located proximate a passenger compartment 26 of motor vehicle 18. While FIG. 1 illustrates an embodiment of a vehicle area, here a truck bed, that may be exposed to outdoor elements, cover assembly configurations and variations contemplated herein are applicable to other vehicle areas, including interior areas of vehicles.

Referring to FIGS. 1-3, cover assembly 10 includes at least one panel 28 movably coupled to a pair of tracks 30, where one track is disposed on each spaced apart sidewall 12 and 14. For example, panel 28 includes on each side 32 thereof a pair of roller assemblies 34 that are engageable with tracks 30 to enable panel 28 to move along tracks 30. Roller assemblies 34 and panel(s) 28 are configured so the panel(s) roll along tracks 30 to a plurality of different positions, as desired to cover and expose areas of bed 16. Although panel 28 is shown in FIG. 2 as having a pair of roller assemblies 34 per panel side formed at upper and lower ends 52 and 70 of the panel, in other configurations a panel can have any number of rollers, including a single roller, positioned along the panel sides for rolling movement along the track 30. Of course, in an alternative embodiment, the roller mechanism and the tracks can be of another configuration that still promote movement, such as a small pin protruding from the panel to engage a complimentary pin-groove in the tracks (for e.g. to promote slidable movement in the tracks), including materials and lubrication to promote movement therebetween. Tracks 30 include a first leg 36 arranged relative to a floor 38 of bed 16 and a second leg 40 arranged relative to floor 38 of bed 16. For example, the first leg 36 can be arranged substantially orthogonal to the floor 38 and the second leg 40 can be arranged substantially parallel to floor 38. Second leg 40 is positioned proximate an upper end 42 of sidewalls 12 and 14, while floor 38 is formed proximate a lower end 44 of sidewalls 12 and 14. Track 30 may include a curved portion 46 extending from the first leg 36 toward second leg 40.

In one configuration, cover assembly 10 includes one or more panel(s) 28 arranged between first legs 36 where the panel(s) 28 form a barrier so objects positioned on the floor 38 are prevented by the panel(s) from sliding off the floor away from the rear 24 or end portion of the vehicle, for example due to jarring movements when the vehicle is in motion. Panel(s) 28 are movable to a plurality of positions that provide access or covering to portions of the bed 16. In this regard, panel 28 may be moved upward along first leg 36 to provide access to bed 16 at rear 24 of the vehicle. Additionally, panel 28 may be moved upward along first leg 36, past curved portion 46 and along second leg 40. Panel 28, therefore, may be positioned substantially parallel with floor 38 and provide access to areas of bed 16 exposed by moving the panels away from those areas or moving the panels to shelter items in areas of the bed beneath the panel. Additionally, positioning cover assembly 10 in a certain orientation relative to bed 16 may improve the aerodynamic characteristics of vehicle 18 in a manner to improve fuel economy.

Panel 28 may be formed from a variety of different materials, including plastics and light-weight metals. Forming panel 28 from plastics and light-weight metals may reduce mass of panel 28, which may increase the ease with which panel 28 may be moved along tracks 30. Materials include those that may be formed, e.g. blow- or injection-molded, etc. Panel 28 may be configured to include a company logo, textured, color, etc.

Light-weight metals that may form panel 28 include aluminum, titanium, or light-weight steels to provide a rigid panel 28. Alternatively, a perimeter of panel 28 may be formed of plastic or a light-weight metal, with a center of panel 28 being formed of a mesh or net material (not shown).

Figure 4:
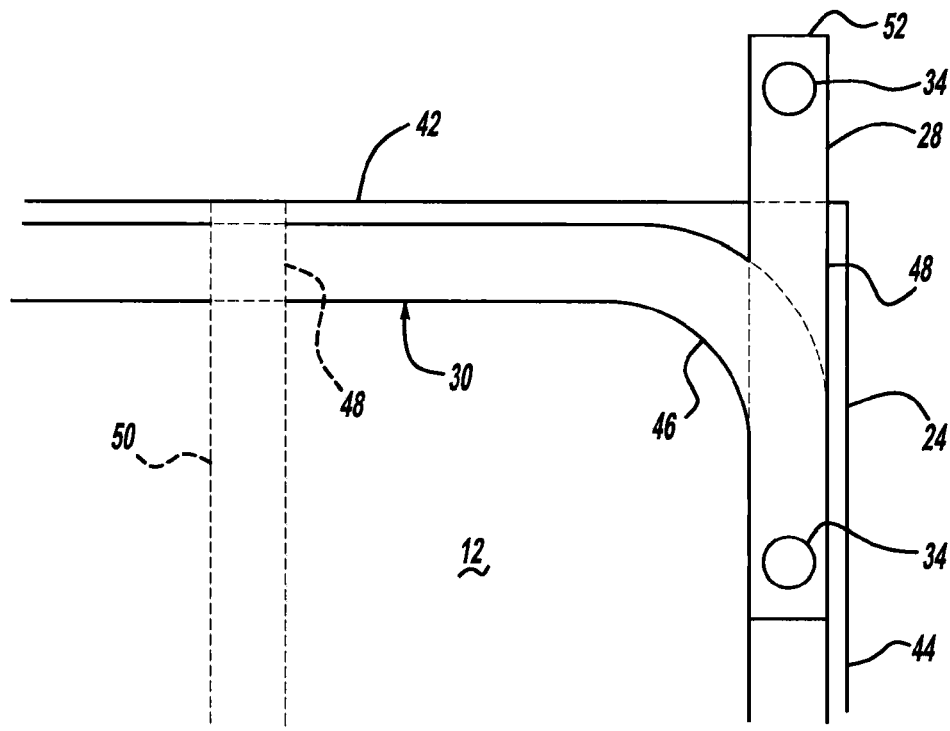
FIG. 4 is a side view of a portion of a track for an embodiment of a cover assembly according to the present disclosure.

As illustrated in FIGS. 3-6, cover assemblies include configurations where panels are insertable and removable to form a plurality of vehicle area covering arrangements. Referring to FIG. 4, panel 28 may be removable from tracks 30. A panel 28 that is removable may be desired when vehicle 18 is carrying items having a size greater than bed 16, e.g. longer than the bed. To remove panel 28 from tracks 30, tracks 30 may each include an opening 48 located proximate the curved portion 46 that enables roller assemblies 24 to exit tracks 30. Although opening 48 is illustrated as being proximate the curved portion 46, it should be understood that opening 48 may be positioned at another location along tracks 30. In another configuration, cover assembly 10 may include panels 28 along legs 36 of track 30 and another portion of panels positioned along legs 40. In another embodiment, an area of bed 16 is not covered by panels along legs 40 (the panels have been removed from that area), so large items that extend above the sidewalls 12, 14 may be placed in the bed.

In another exemplary embodiment, tracks 30 may also include a third leg 50 extending from the second track 40 toward the floor 38 of bed 16. When panel 28 is removed from tracks 30, panel 28 may be placed at a different position, e.g. at the third leg or perhaps in another location of the cover assembly. Such a configuration enables bed 16 to be sectioned into different sizes, as desired. Although only a single third leg 50 is illustrated in FIG. 4, it should be understood that a plurality of third legs 50 may be formed at various positions (e.g. FIG. 1) of bed 16 such that panel 28 may be located therein as desired. In an alternative embodiment, one or more third legs extend toward the floor 38 without contact at the floor. Further, by providing a third leg 50, or a plurality of third legs 50, a plurality of panels 28 may be used simultaneously to section bed 16 into different sizes. In one embodiment, a plurality of panels 28 may be used to act as a tonneau cover. And in another embodiment, cover assembly 10 includes a locking feature to maintain a position one or more panels along the tracks 30, e.g. a brake feature on a roller, a locking pin between a leg and a panel, etc. In another embodiment, a mechanism such as a collector apparatus (manual or motorized) may be incorporated to retract panels in a manner to expose a vehicle area and thereafter move the panels back over the same area.

Figure 5:
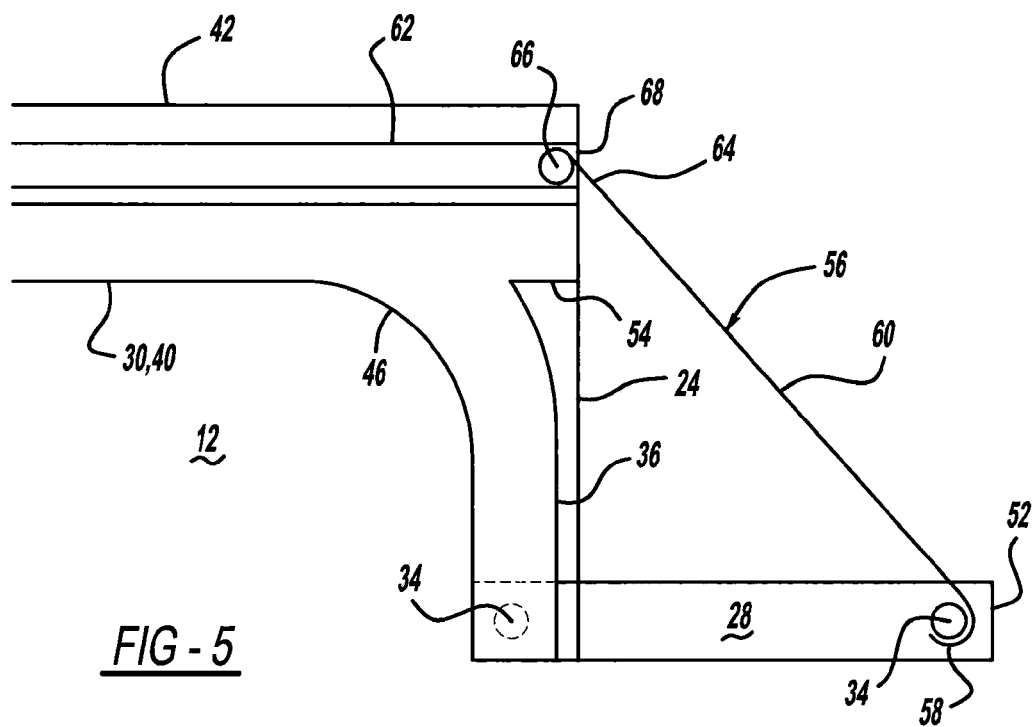
FIG. 5 is a side view of a portion of a track including a linkage mechanism for another embodiment of a cover assembly according to the present disclosure.

In another configuration and referring to FIG. 5, cover assembly 10 includes panel 28 that may be rotated in a direction away from rear 24 of vehicle 18 such that roller assembly 34 located at upper end 52 of panel 28 may exit tracks 30 through a second opening 54. Panel 28, therefore, may be oriented substantially co-planar with floor 38 of bed 16. Second opening 54 may also be used as an alternative exit point for removing panel 28 from tracks 30. In this regard, if panel 28 is oriented in second leg 40, panel 28 may be removed from tracks 30 by pulling panel 28 rearwardly through second opening 54. Referring to FIGS. 3 and 5, in another embodiment cover assembly 10 can include a support linkage mechanism 56, for example when panel 28 is, opened at rear 24 of vehicle. In an exemplary embodiment, roller assembly 34 exits tracks 30 via second opening 54, linkage mechanism 56 including a hook member 58 coupled to a wire 60 engages and couples to roller assembly 34. Linkage mechanism 56 may be disposed in an auxiliary track 62 formed adjacent second leg 40 of tracks 30. At an end 64 of wire 60 opposite hook member 58, a pin 66 may be formed that slides along auxiliary track 62 until reaching an end 68 thereof, which prevents pin 66 from exiting auxiliary track 62.

Wire 60 may have a length sufficient to allow panel 28 to lie substantially co-planar with bed 16. Alternatively, wire 60 may have a length such that panel 28 is not co-planar with bed 16, e.g. panel 28 may be angled downward toward the ground. As described above, cover assembly 10 may be positioned and operable in a manner so that linkage mechanism 56 supports panel 28 when a portion of the panel is moved through second opening 54 and rotated relative to bed 16. Additionally, the linkage mechanism can be configured so when deployed panel 28 (as shown in FIG. 5) is returned to the closed position (within tracks 30) the linkage mechanism also returns back to a stowed position, for example proximate auxiliary track 62.

Figure 6:
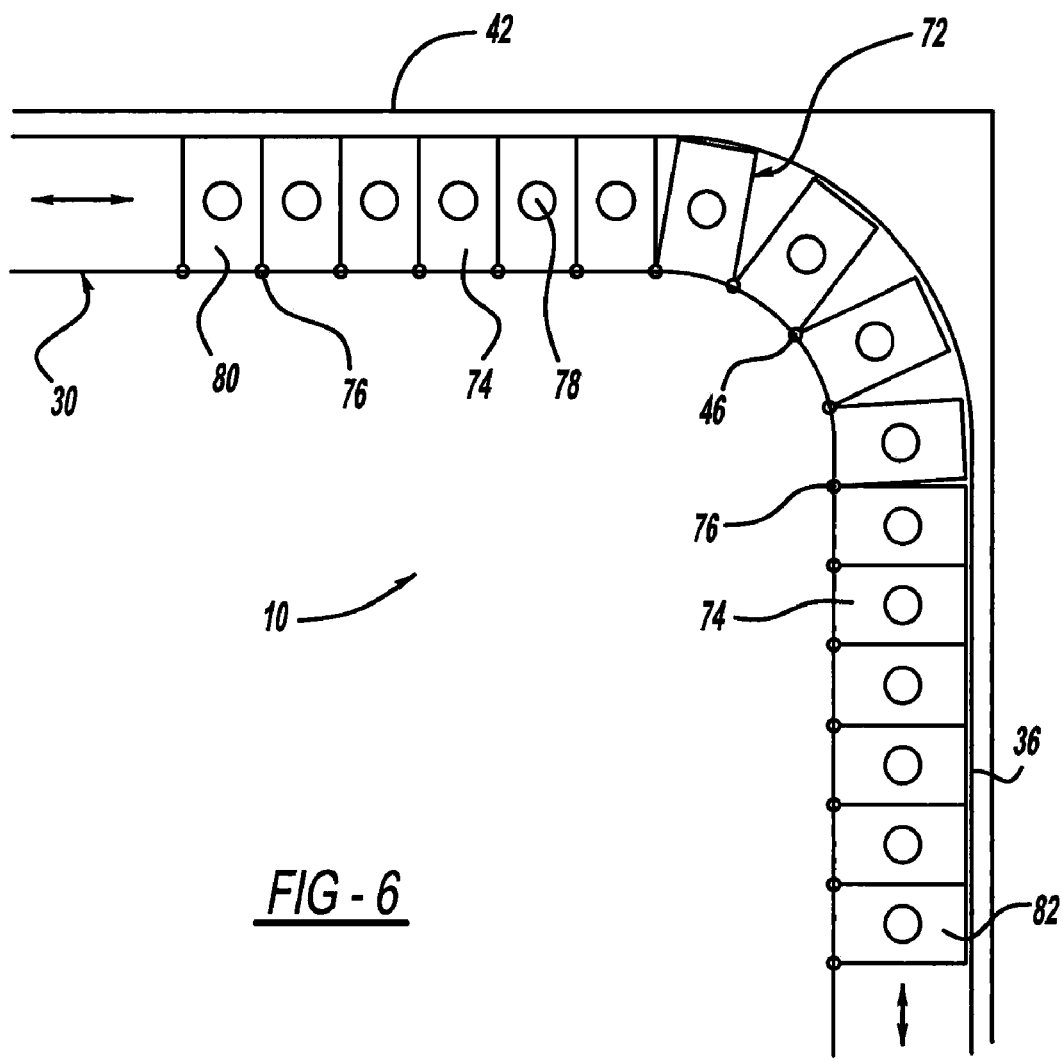
FIG. 6 is a side view of a portion of a track for another embodiment of a cover assembly according to the present disclosure.

Referring to FIG. 6, in another exemplary embodiment, cover assembly 10 includes a panel assembly 72 formed of a plurality of linked panels or slats 74 configured to move along track 30 including the curved portion 46. Each slat 74 is releasably coupled to one another by hinges 76 and includes a roller assembly 78 on two panel sides. Such a configuration enables panel assembly 72 to a have a length from a first slat 80 to a last slat 82 that may be lengthened or shortened, as desired, by simply increasing or decreasing the number of slats 74.

The above description is merely exemplary in nature and, thus, variations that do not depart from the gist of the disclosure are intended to be within the scope thereof.

What is claimed is:

1. A cover assembly for a vehicle having a pair of sidewalls, the cover assembly comprising:
    a track positioned on each sidewall, each track including a first leg arranged substantially orthogonal to a floor of the vehicle and a second leg positioned above the floor and extending from the first leg;
    at least one panel being movably coupled to said tracks; and
    a linkage assembly joined to an auxiliary track positioned at each track, an end of said panel being engageable with said linkage assembly.

2. The cover assembly of claim 1, further comprising a plurality of panels hingedly coupled together.

3. The cover assembly of claim 1, wherein said at least one panel is removable from each track at a position located between said first and second legs.

4. The cover assembly of claim 1, further comprising a third leg extending from said second leg.

5. The cover assembly of claim 1, wherein said track includes a curved portion extending from said first leg toward said second leg.

6. The cover assembly of claim 1, wherein each track includes an opening configured so a portion of said panel can move through said opening to engage said linkage assembly.

7. The cover assembly of claim 1, wherein said panel includes a roller assembly for movement along said tracks.

8. A cover assembly for a vehicle having a pair of sidewalls, comprising:

a track positioned on each sidewall, each track including a first leg arranged substantially orthogonal to a floor extending from the sidewalls, the first leg includes a curved portion extending toward a second leg arranged above the floor;

at least a third leg extends from each of the second legs toward the floor; and a removable panel configured for movement along said tracks to provide access to the floor, said panel being removable through an opening formed in said tracks between said first and second legs and reinsertable into said third legs.

9. The cover assembly of claim 8, wherein said panel is positioned within said tracks to define a barrier at an end portion of the vehicle.

10. The cover assembly of claim 8, wherein said panel includes a plurality of slats hingedly coupled together.

11. The cover assembly of claim 8, wherein said panel includes a plurality of roller assemblies configured for movement along said tracks.

12. The cover assembly of claim 8, further comprising a linkage assembly that couples to said panel.

13. The cover assembly of claim 12, wherein an end of said panel is removable through said opening to engage said linkage assembly.

14. The cover assembly of claim 12, wherein said linkage assembly is joined to an auxiliary track formed positioned at each track, said linkage assembly including a hook and a wire that engage said panel.

* * * * *